(12) United States Patent
Murasato et al.

(10) Patent No.: US 11,745,610 B2
(45) Date of Patent: Sep. 5, 2023

(54) POWER CONVERSION DEVICE AND POWER TRANSFER SYSTEM

(71) Applicant: TOYOTA JIDOSHA KABUSHIKI KAISHA, Toyota (JP)

(72) Inventors: Kenji Murasato, Toyota (JP); Hironobu Hashimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/524,235

(22) Filed: Nov. 11, 2021

(65) Prior Publication Data

US 2022/0203852 A1 Jun. 30, 2022

(30) Foreign Application Priority Data

Dec. 28, 2020 (JP) ................. 2020-218310

(51) Int. Cl.
| | |
|---|---|
| *B60L 53/22* | (2019.01) |
| *H02J 7/02* | (2016.01) |
| *H02M 1/42* | (2007.01) |
| *H02M 7/06* | (2006.01) |
| *H02J 7/00* | (2006.01) |
| *B60L 53/16* | (2019.01) |
| *B60L 53/62* | (2019.01) |

(52) U.S. Cl.
CPC ............... *B60L 53/22* (2019.02); *B60L 53/16* (2019.02); *B60L 53/62* (2019.02); *H02J 7/0045* (2013.01); *H02J 7/02* (2013.01); *H02M 1/425* (2013.01); *H02M 7/06* (2013.01); *H02J 2207/20* (2020.01)

(58) Field of Classification Search
CPC .......... B60L 53/22; B60L 53/16; B60L 53/62; H02J 7/0045; H02J 7/02; H02J 2207/20; H02M 1/425; H02M 7/06; H02M 7/53871; H02M 3/33573
See application file for complete search history.

(56) References Cited

U.S. PATENT DOCUMENTS

| | | | |
|---|---|---|---|
| 8,922,049 B2 * | 12/2014 | Holland | B60L 3/0069 307/9.1 |
| 2011/0121780 A1 * | 5/2011 | Fukuo | B60L 3/04 320/109 |
| 2016/0325636 A1 * | 11/2016 | Masuda | B60L 53/18 |
| 2018/0164362 A1 * | 6/2018 | Premerlani | G01R 31/52 |
| 2020/0139831 A1 | 5/2020 | Ichikawa | |

FOREIGN PATENT DOCUMENTS

| | | |
|---|---|---|
| JP | 2020-068618 A | 4/2020 |
| JP | 2020-078153 A | 5/2020 |

* cited by examiner

*Primary Examiner* — Elim Ortiz
(74) *Attorney, Agent, or Firm* — Dinsmore & Shohl LLP (57) ABSTRACT

A power conversion device configured to execute power conversion between a vehicle and an external power supply or an external load includes a DC connector, a charging port, a power supply port, a bidirectional power conversion circuit, a switching circuit configured to execute switching to choose whether to electrically connect the power conversion circuit and the charging port or electrically connect the power conversion circuit and the power supply port, and a control circuit configured to control the power conversion circuit and the switching circuit to selectively execute a charging operation or a power supply operation.

9 Claims, 10 Drawing Sheets

POWER CONVERSION DEVICE AND POWER TRANSFER SYSTEM

CROSS-REFERENCE TO RELATED APPLICATION

This application claims priority to Japanese Patent Application No. 2020-218310 filed on Dec. 28, 2020, incorporated herein by reference in its entirety.

BACKGROUND

1. Technical Field

The present disclosure relates to a power conversion device and a power transfer system.

2. Description of Related Art

Motor vehicles currently available in the market (such as a plug-in hybrid vehicle and an electric vehicle) include power conversion devices configured to charge the motor vehicles. The power conversion device converts alternating current (AC) power supplied from an external power supply (power supply equipment) outside the motor vehicle into direct current (DC) power for charging an on-board battery.

It is expected in the future that an external power supply in a DC-charging system (so-called quick charger) will become widespread in addition to the external power supply in the AC-charging system (so-called ordinary charger). The quick charger does not execute AC/DC conversion. Therefore, a user who mainly uses the quick charger does not need the on-board power conversion device for AC/DC conversion. In view of those circumstances, a power conversion device that can be carried (that is, a portable charger) is proposed as an alternative to the on-board (vehicle-equipped) power conversion device (see, for example, Japanese Unexamined Patent Application Publication No. 2020-78153 (JP 2020-78153 A)).

SUMMARY

The power conversion device may have a function of supplying electric power from the vehicle in addition to the function of charging the vehicle. More specifically, the power supply function is a function of converting DC power of the vehicle (for example, the on-board battery) into AC power and supplying the AC power to an external device (such as a socket or an external electric device). In this power conversion device, the charging and the power supply are desirably managed appropriately.

The present disclosure provides a power conversion device and a power transfer system that is configured such that charging and power supply are managed appropriately.

A power conversion device according to a first aspect of the present disclosure is configured to execute power conversion between a vehicle and an external power supply or an external load. The power conversion device includes a DC connector, a charging port, a power supply port, a power conversion circuit, a switching circuit, and a control circuit. The DC connector is configured to transfer DC power between the DC connector and an inlet of the vehicle. The charging port is configured to receive AC power from the external power supply. The power supply port is configured to output AC power to the external load. The power conversion circuit is a bidirectional power conversion circuit and is configured to execute power conversion between the DC connector and the charging port and between the DC connector and the power supply port. The switching circuit is configured to execute switching to choose whether to electrically connect the power conversion circuit and the charging port or electrically connect the power conversion circuit and the power supply port. The control circuit is configured to control the power conversion circuit and the switching circuit to selectively execute a charging operation or a power supply operation.

The charging operation is an operation of converting AC power supplied from the external power supply via the charging port into DC power by the power conversion circuit, outputting the DC power from the DC connector, and charging the vehicle with the DC power. The power supply operation is an operation of converting DC power supplied from the vehicle via the DC connector into AC power by the power conversion circuit, outputting the AC power from the power supply port, and supplying the AC power to the external load.

In the power conversion device according to the first aspect of the present disclosure, each of the power conversion circuit, the charging port, and the power supply port may include a first terminal and a second terminal. The switching circuit may include a first relay and a second relay. The first relay may be configured to execute switching to choose whether to connect the first terminal of the power conversion circuit to the first terminal of the charging port or to the first terminal of the power supply port. The second relay may be configured to execute switching to choose whether to connect the second terminal of the power conversion circuit to the second terminal of the charging port or to the second terminal of the power supply port.

In the power conversion device according to the first aspect of the present disclosure, the switching circuit executes switching to choose whether to electrically connect the power conversion circuit and the charging port or electrically connect the power conversion circuit and the power supply port. The charging port and the power supply port are not electrically connected together. Therefore, the external power supply connected to the charging port and the external load connected to the power supply port can electrically be disconnected constantly. Thus, the charging and the power supply of the power conversion device can be managed appropriately.

In the power conversion device according to the first aspect of the present disclosure, the control circuit may be configured to use a voltage supplied from the vehicle via the DC connector as an operation voltage of the control circuit during execution of the power supply operation.

In the power conversion device according to the first aspect of the present disclosure, the control circuit may be configured to use a voltage supplied from the external power supply via the charging port as an operation voltage of the control circuit during execution of the charging operation.

In the power conversion device according to the first aspect of the present disclosure, the control circuit operates by using the operation voltage supplied from the outside of the power conversion device. Therefore, the source of the operation voltage of the power conversion device (such as an internal battery) need not be provided in the power conversion device. Thus, the structure of the power conversion device can be simplified, and costs for components can be reduced.

The power conversion device according to the first aspect of the present disclosure may further include an operator configured to receive a user's operation for selecting the charging operation or the power supply operation. The control circuit may be configured to control the switching circuit to electrically connect the charging port and the power conversion circuit until the operator receives the user's operation.

In the power conversion device according to the first aspect of the present disclosure, a state in which the charging operation is selected is set as a default state until the operator receives the user's operation. In general, the charging operation is selected more frequently than the power supply operation. Thus, the user can save some work for selecting the charging operation.

A power transfer system according to a second aspect of the present disclosure includes a vehicle and a power conversion device configured to execute power conversion between the vehicle and an external power supply or an external load. The power conversion device includes a DC connector, a charging port, a power supply port, a power conversion circuit, a switching circuit, and a control circuit. The DC connector is configured to transfer DC power between the DC connector and an inlet of the vehicle. The charging port is configured to receive AC power from the external power supply. The power supply port is configured to output AC power to the external load. The power conversion circuit is a bidirectional power conversion circuit and is configured to execute power conversion between the DC connector and the charging port and between the DC connector and the power supply port. The switching circuit is configured to execute switching to choose whether to electrically connect the power conversion circuit and the charging port or electrically connect the power conversion circuit and the power supply port. The control circuit is configured to control the power conversion circuit and the switching circuit to selectively execute a charging operation or a power supply operation. The charging operation is an operation of converting AC power supplied from the external power supply via the charging port into DC power by the power conversion circuit, outputting the DC power from the DC connector, and charging the vehicle with the DC power. The power supply operation is an operation of converting DC power supplied from the vehicle via the DC connector into AC power by the power conversion circuit, outputting the AC power from the power supply port, and supplying the AC power to the external load. The control circuit is configured to use a voltage supplied from the vehicle via the DC connector as an operation voltage of the control circuit during execution of the power supply operation. The vehicle includes a relay configured to output the operation voltage of the control circuit for execution of the power supply operation after detection of connection between the inlet and the DC connector.

In the power transfer system according to the second aspect of the present disclosure, the operation voltage can be supplied more securely after the detection of connection between the inlet and the DC connector. In the power transfer system according to the second aspect of the present disclosure, each of the power conversion circuit, the charging port, and the power supply port may include a first terminal and a second terminal. The switching circuit may include a first relay and a second relay. The first relay may be configured to execute switching to choose whether to connect the first terminal of the power conversion circuit to the first terminal of the charging port or to the first terminal of the power supply port. The second relay may be configured to execute switching to choose whether to connect the second terminal of the power conversion circuit to the second terminal of the charging port or to the second terminal of the power supply port.

According to the present disclosure, the charging and the power supply can be managed appropriately in the power conversion device to be provided outside the vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

An embodiment of the present disclosure is described below in detail with reference to the drawings. In the drawings, the same or corresponding parts are represented by the same reference symbols to omit redundant description.

Embodiment

Overall Configurations of Power Transfer System

Figure 1:
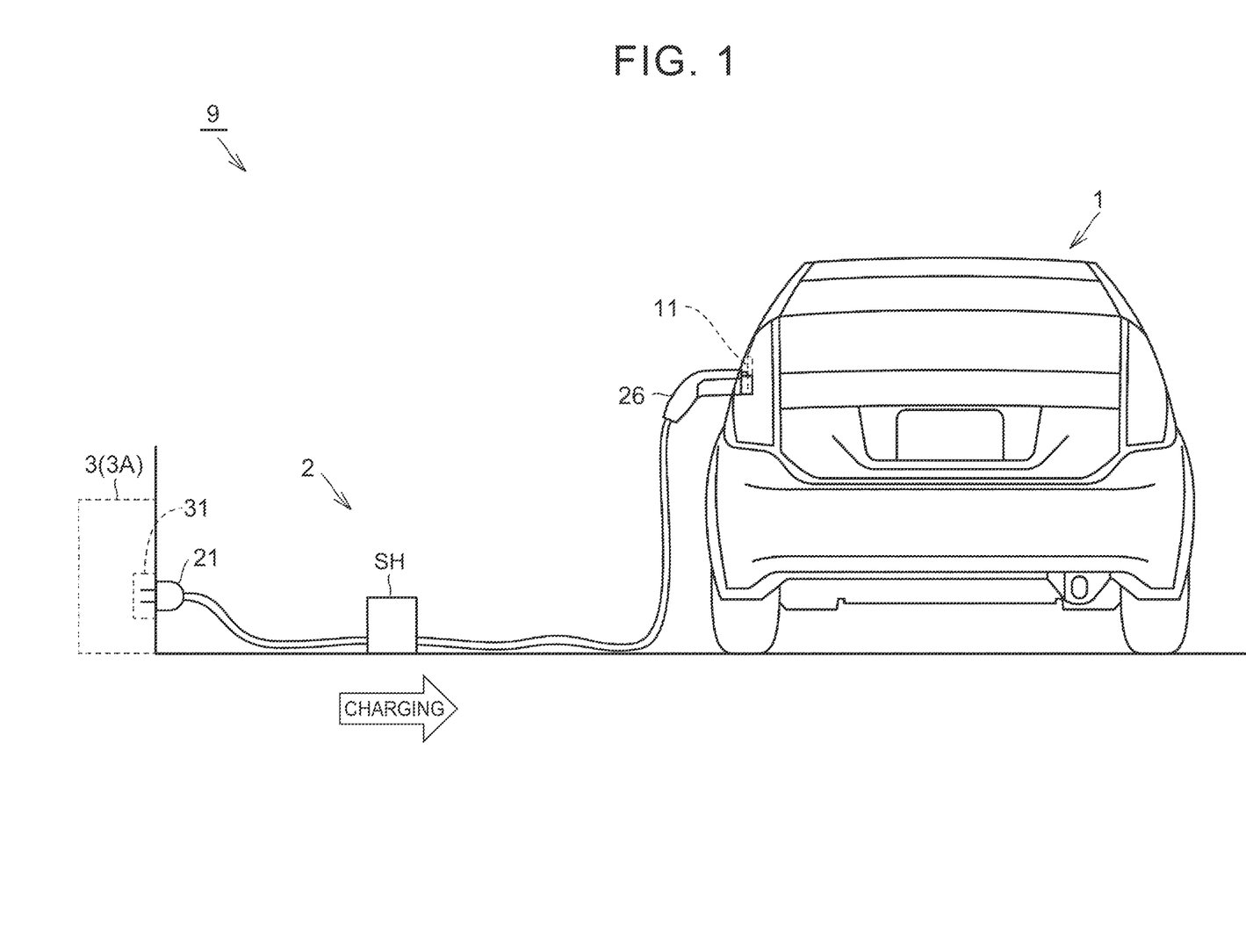
FIG. 1 is a schematic diagram illustrating the overall configuration of a power transfer system during a charging operation of a portable charger according to an embodiment.
Figure 2:
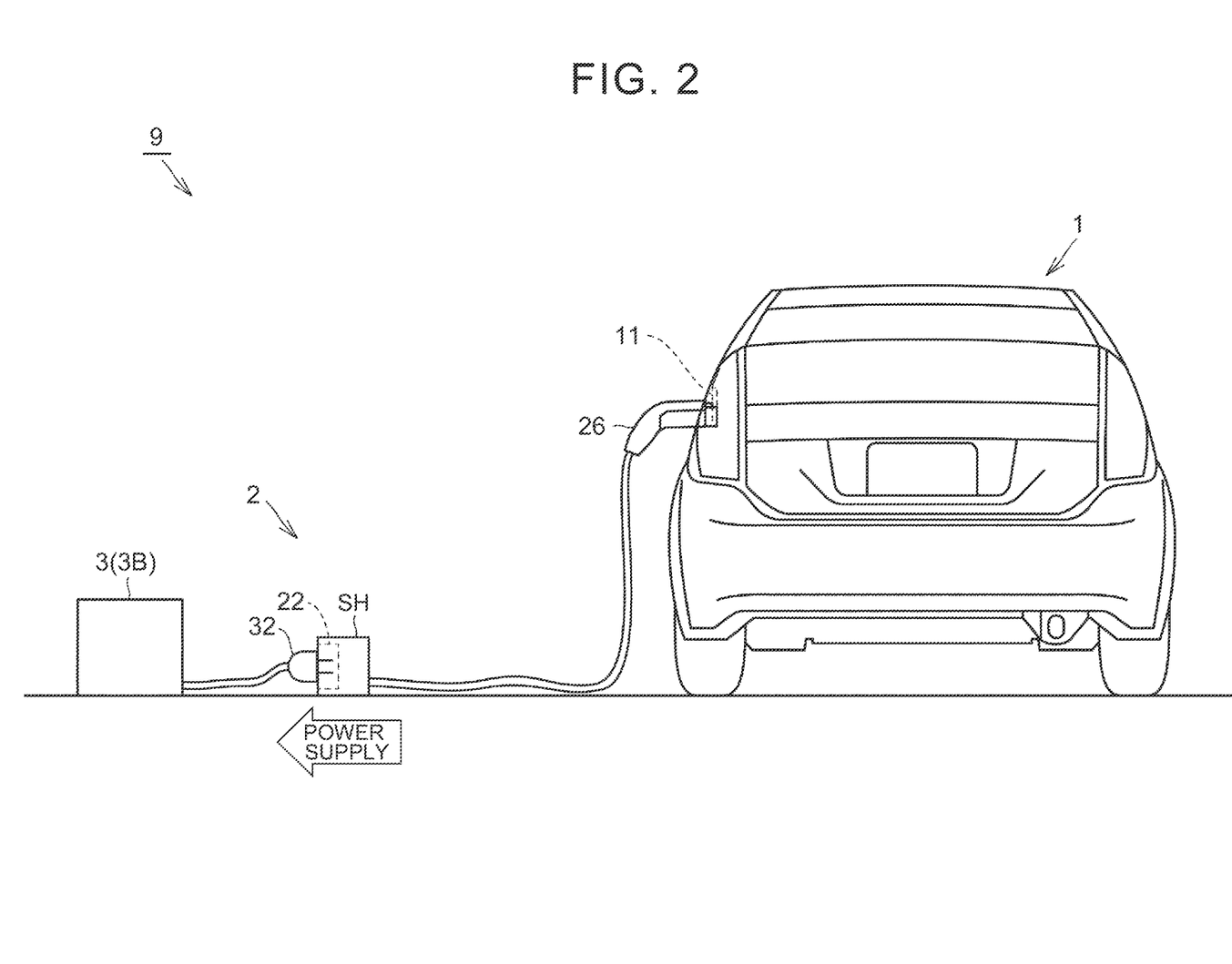
FIG. 2 is a schematic diagram illustrating the overall configuration of the power transfer system during a power supply operation of the portable charger according to the embodiment.

FIG. 1 is a schematic diagram illustrating the overall configuration of a power transfer system 9 during a charging operation of a portable charger 2 according to this embodiment. FIG. 2 is a schematic diagram illustrating the overall configuration of the power transfer system 9 during a power supply operation of the portable charger 2 according to this embodiment. Referring to FIG. 1 and FIG. 2, the power transfer system 9 includes a vehicle 1, the portable charger 2, and an external device 3.

The vehicle 1 is chargeable with electric power supplied from the external device 3 (so-called external charging). The vehicle 1 can supply the external device 3 with electric power stored in the vehicle 1 (so-called external power feeding). The vehicle 1 can also supply the external device 3 with electric power generated by the vehicle 1 (so-called external power feeding). In this embodiment, the vehicle 1 is an electric vehicle (EV). The vehicle 1 may be a plug-in hybrid vehicle (PHV) or a plug-in fuel cell vehicle (PFCV) when both the external charging and the external power feeding can be executed.

The portable charger 2 is a power conversion device having a power supply function in addition to a charging function. The portable charger 2 is loaded on the vehicle 1 by a user as necessary. For example, when charging the vehicle 1 at a place outside and/or when supplying electric power from the vehicle 1, the portable charger 2 is unloaded from the vehicle 1 for use.

The external device 3 is provided outside the vehicle 1 and the portable charger 2. During the charging operation of the portable charger 2, the external device 3 is an external power supply 3A configured to supply AC power to the outside as illustrated in FIG. 1. For example, the external power supply 3A is vehicle charging equipment (such as a charger installed at a house of the user or a public charging station). The external power supply 3A may be electric power equipment connected to a system power supply (such as a socket). FIG. 1 illustrates a situation in which an inlet 11 of the vehicle 1 and a connector 31 of the external power supply 3A (socket in this example) are electrically connected via the portable charger 2 prior to the start of the charging operation of the portable charger 2.

During the power supply operation of the portable charger 2, the external device 3 is an external load 3B configured to receive AC power supplied from the outside as illustrated in FIG. 2. For example, the external load 3B may be various electric devices that consume the AC power. FIG. 2 illustrates a situation in which the inlet 11 of the vehicle 1 and a connector 32 of the external load 3B (plug in this example) are electrically connected via the portable charger 2 prior to the start of the power supply operation of the portable charger 2.

Detailed Configuration of Portable Charger

Figure 3:
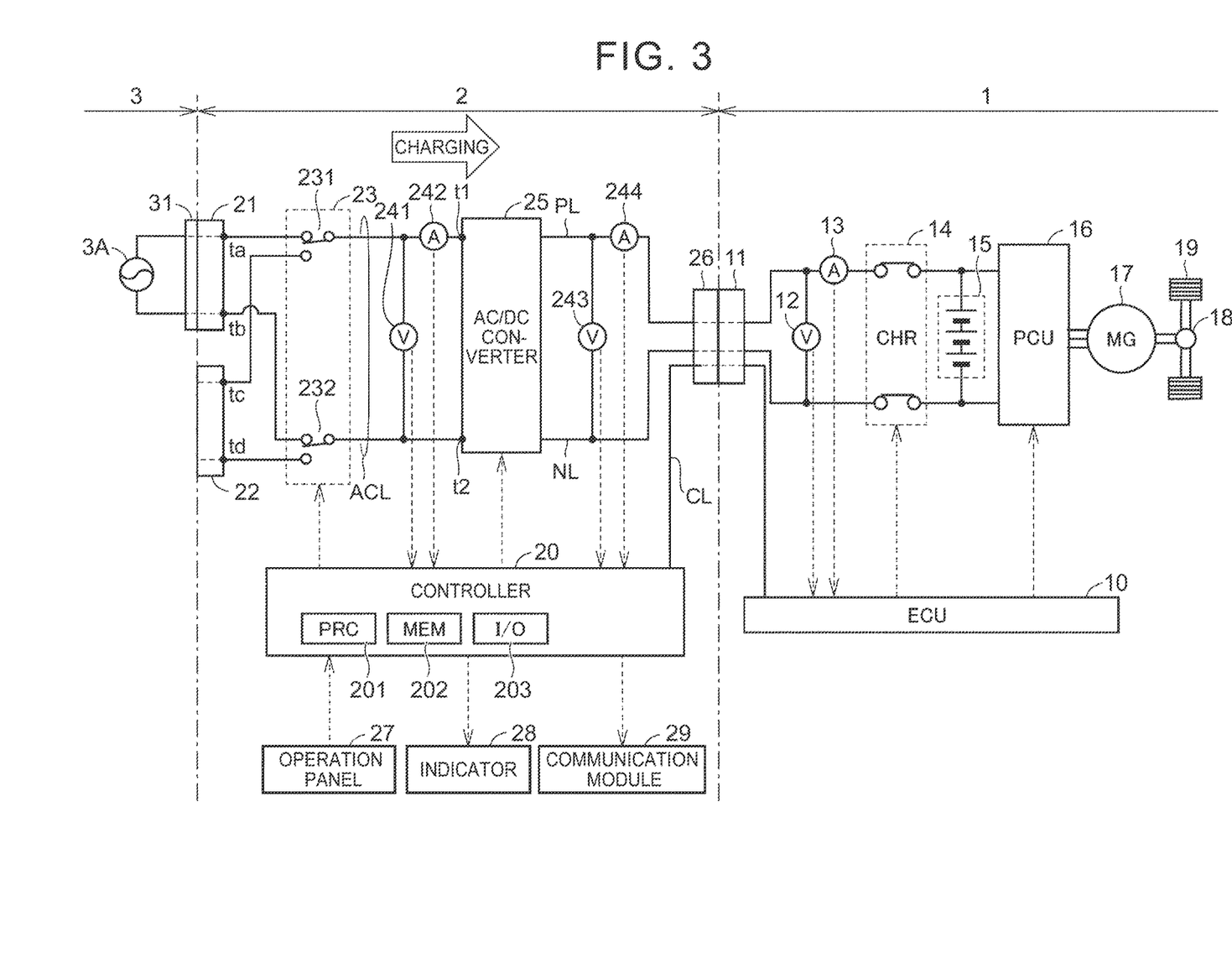
FIG. 3 is a circuit block diagram illustrating further details of the configuration of the power transfer system during the charging operation of the portable charger.
Figure 4:
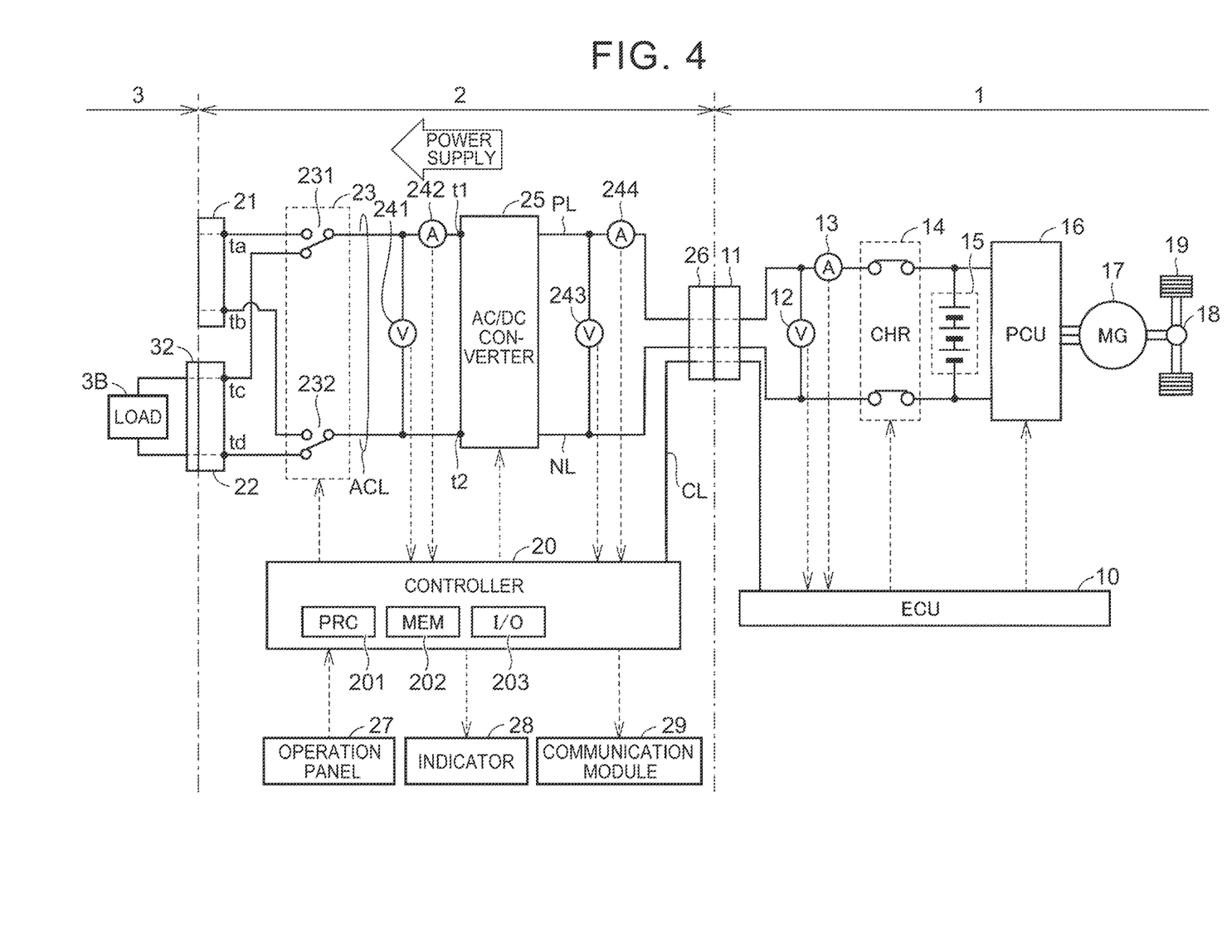
FIG. 4 is a circuit block diagram illustrating further details of the configuration of the power transfer system during the power supply operation of the portable charger.

FIG. 3 is a circuit block diagram illustrating further details of the configuration of the power transfer system 9 during the charging operation of the portable charger 2. FIG. 4 is a circuit block diagram illustrating further details of the configuration of the power transfer system 9 during the power supply operation of the portable charger 2.

Referring to FIG. 3 and FIG. 4, the vehicle 1 includes an inlet 11, a voltage sensor 12, a current sensor 13, a charging relay 14, a battery 15, a power control unit (PCU) 16, a motor generator 17, a power transmission gear 18, driving wheels 19, and an electronic control unit (ECU) 10.

A DC connector 26 of the portable charger 2 is insertable into the inlet 11 along with mechanical coupling such as fitting. Along with the insertion of the DC connector 26, the vehicle 1 and the portable charger 2 are electrically connected together. The ECU 10 of the vehicle 1 and a controller 20 of the portable charger 2 are connected by a communication line CL conforming to communication standards such as a controller area network (CAN). Thus, various types of information (such as commands, messages, or data) can be exchanged between the ECU 10 and the controller 20.

The voltage sensor 12 detects a DC voltage between power lines at a point between the inlet 11 and the charging relay 14, and outputs a detection result to the ECU 10. The current sensor 13 detects a current flowing through the power lines, and outputs a detection result to the ECU 10. Based on the detection results from the voltage sensor 12 and the current sensor 13, the ECU 10 can calculate electric power to be supplied from the portable charger 2 to the vehicle 1 (electric power for charging the battery 15).

The charging relay 14 is electrically connected between the inlet 11 and the battery 15. When the charging relay 14 is closed in response to a command from the ECU 10, electric power is transferable between the inlet 11 and the battery 15.

The battery 15 is a battery pack including a plurality of cells (not illustrated). Each cell is a secondary battery such as a nickel-metal hydride battery or a lithium ion battery. The battery 15 supplies electric power for generating a driving force of the vehicle 1. The battery 15 stores electric power generated by the motor generator 17. The battery 15 is charged with electric power supplied from the external power supply 3A via the portable charger 2.

The PCU 16 includes a converter and an inverter (both are not illustrated). In response to a command from the ECU 10, the PCU 16 drives the motor generator 17 by using electric power supplied from the battery 15.

The motor generator 17 is an AC rotating electrical machine. An output torque of the motor generator 17 is transmitted to the driving wheels 19 through the power transmission gear 18 to cause the vehicle 1 to travel. During a braking operation of the vehicle 1, the motor generator 17 can generate electric power by using a rotational force of the driving wheels 19. The electric power generated by the motor generator 17 is converted by the PCU 16 into electric power for charging the battery 15.

The ECU 10 controls devices (such as the charging relay 14 and the PCU 16) in response to signals from sensors to achieve a desired state of the vehicle 1. The ECU 10 may be divided into a plurality of ECUs for individual functions (such as a battery ECU and an MG-ECU).

The portable charger 2 converts AC power supplied from the external power supply 3A into DC power, and charges the battery 15 mounted on the vehicle 1 with the DC power. The portable charger 2 converts DC power supplied from the vehicle 1 into AC power, and supplies the AC power to the external load 3B (see FIG. 4 and FIG. 5).

The portable charger 2 includes an AC charging port 21, an AC power supply port 22, a switching circuit 23, power lines ACL, a voltage sensor 241, a current sensor 242, an AC/DC converter 25, power supply lines PL and NL, a voltage sensor 243, a current sensor 244, a DC connector 26, an operation panel 27, an indicator 28, a communication module 29, and the controller 20. Among the components of the portable charger 2, components other than external interfaces (AC charging port 21, AC power supply port 22, and DC connector 26) can be arranged on the surfaces or inside of a single casing SH (see FIG. 1 and FIG. 2).

The AC charging port 21 is mechanically connected to the connector 31 (such as a socket) of the external power supply 3A prior to the start of the charging operation of the portable charger 2 (see FIG. 3). The AC charging port 21 connected to the connector 31 of the external power supply 3A receives AC power supplied from the external power supply 3A. The AC charging port 21 includes a first terminal ta and a second terminal tb. The first terminal ta is electrically connected to a relay 231. The second terminal tb is electrically connected to a relay 232.

The AC power supply port 22 is mechanically connected to the connector 32 (such as a plug) of the external load 3B prior to the start of the power supply operation of the portable charger 2 (see FIG. 4). The AC power supply port 22 connected to the connector 32 of the external load 3B outputs AC power to be supplied to the external load 3B. The AC power supply port 22 includes a first terminal tc and a second terminal td. The first terminal tc is electrically connected to the relay 231. The second terminal td is electrically connected to the relay 232.

In response to a command from the controller 20, the switching circuit 23 executes switching to choose whether to electrically connect the AC charging port 21 to the AC/DC converter 25 or electrically connect the AC power supply port 22 to the AC/DC converter 25. In this example, the switching circuit 23 includes two relays 231 and 232. Each of the relays 231 and 232 has a single-pole double-throw (SPDT) circuit structure.

The relay (first relay) 231 executes switching to choose whether to connect a first terminal t1 of the AC/DC converter 25 to the first terminal ta of the AC charging port 21 or to the first terminal tc of the AC power supply port 22. The relay (second relay) 232 executes switching to choose whether to connect a second terminal t2 of the AC/DC converter 25 to the second terminal tb of the AC charging port 21 or to the second terminal td of the AC power supply port 22.

In the charging operation of the portable charger 2, contacts of the switching circuit 23 are selected to electrically connect the AC charging port 21 and the AC/DC converter 25 via the power lines ACL as illustrated in FIG. 3. More specifically, the relay 231 connects the first terminal t1 of the AC/DC converter 25 to the first terminal to of the AC charging port 21. The relay 232 connects the second terminal t2 of the AC/DC converter 25 to the second terminal tb of the AC charging port 21.

In the power supply operation of the portable charger 2, the contacts of the switching circuit 23 are selected to electrically connect the AC power supply port 22 and the AC/DC converter 25 via the power lines ACL as illustrated in FIG. 4. More specifically, the relay 231 connects the first terminal t1 of the AC/DC converter 25 to the first terminal tc of the AC power supply port 22. The relay 232 connects the second terminal t2 of the AC/DC converter 25 to the second terminal td of the AC power supply port 22.

The power lines ACL electrically connect the switching circuit 23 and the AC/DC converter 25. The power lines ACL transfer AC power between the switching circuit 23 and the AC/DC converter 25.

The voltage sensor 241 detects an AC voltage between the power lines ACL, and outputs a detection result to the controller 20. The current sensor 242 detects an alternating current flowing through the power lines ACL, and outputs a detection result to the controller 20.

The AC/DC converter 25 converts AC power on the power lines ACL that is supplied from the external power supply 3A into DC power for charging the battery 15 mounted on the vehicle 1 (AC/DC conversion operation). The AC/DC converter 25 can also convert DC power supplied from the vehicle 1 into AC power to be supplied to the external load 3B (DC/AC conversion operation). That is, the AC/DC converter 25 can execute bidirectional power conversion operations.

Figure 5:
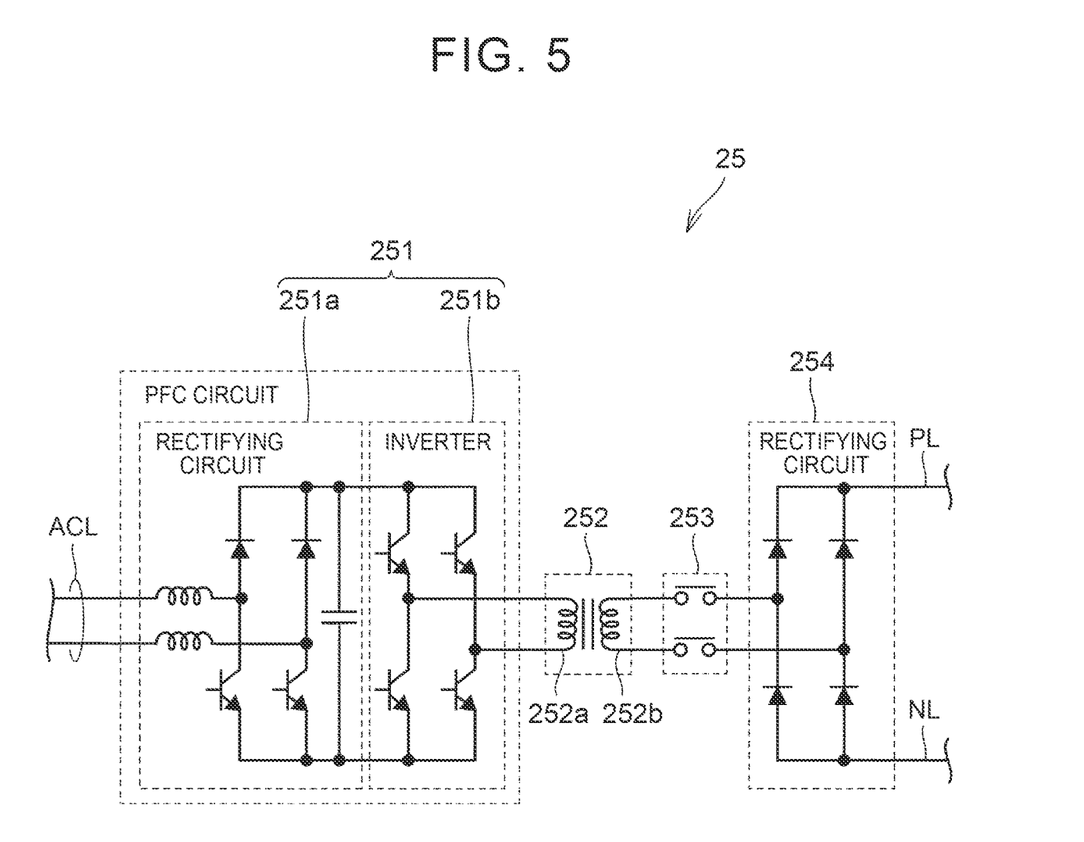
FIG. 5 is a diagram illustrating an example of the circuit structure of an AC/DC converter.

FIG. 5 is a diagram illustrating an example of the circuit structure of the AC/DC converter 25. Referring to FIG. 5, the AC/DC converter 25 includes a power factor correction (PFC) circuit 251, an isolation circuit 252, an interrupter switch 253, and a rectifying circuit 254.

The PFC circuit 251 includes a rectifying circuit 251a and an inverter 251b. The rectifying circuit 251a rectifies AC power, steps up a voltage, and outputs DC power at the stepped up voltage to the inverter 251b. More specifically, the rectifying circuit 251a is a step-up chopper circuit including two sets of upper and lower arms, two reactors, and a smoothing capacitor. In each set of the upper and lower arms, the upper arm includes a diode, and the lower arm includes a switching element.

The inverter 251b converts DC power from the rectifying circuit 251a into high-frequency AC power. For example, the inverter 251b is a full-bridge circuit including four switching elements. Each switching element is controlled by the controller 20.

The isolation circuit 252 is an isolation transformer including a first coil 252a and a second coil 252b. The isolation circuit 252 electrically isolates a power path on the PFC circuit 251 side relative to the first coil 252a from a power path on the rectifying circuit 254 side relative to the second coil 252b. In this state, the isolation circuit 252 steps up an AC voltage applied to the first coil 252a, and outputs the AC voltage to the second coil 252b.

The interrupter switch 253 is electrically connected between the second coil 252b and the rectifying circuit 254. The interrupter switch 253 can switch conduction and interruption of a current flowing through the second coil 252b.

The rectifying circuit 254 converts AC power from the second coil 252b of the isolation circuit 252 into DC power. The rectifying circuit 254 is a diode bridge circuit including four diodes. The AC/DC converter 25 is an example of "power conversion circuit" according to the present disclosure.

Referring back to FIG. 3 and FIG. 4, the power supply lines PL and NL electrically connect the AC/DC converter 25 and the DC connector 26. The power supply lines PL and NL transfer DC power between the AC/DC converter 25 and the DC connector 26.

The voltage sensor 243 detects a DC voltage between the power supply line PL and the power supply line NL, and outputs a detection result to the controller 20. The current sensor 244 detects a direct current flowing through the power supply line PL, and outputs a detection result to the controller 20.

The DC connector 26 is insertable into the inlet 11 of the vehicle 1. During the charging operation of the portable charger 2, the DC connector 26 outputs DC power from the AC/DC converter 25 to the inlet 11. During the power supply operation of the portable charger 2, the DC connector 26 receives DC power from the inlet 11.

The operation panel 27 receives a user's operation on the portable charger 2. In this embodiment, the operation panel 27 receives, for example, a user's operation for selecting the charging operation or the power supply operation of the portable charger 2. The operation panel 27 is an example of "operator" according to the present disclosure.

In response to a command from the controller 20, the indicator 28 notifies the user about an operation status of the portable charger 2. For example, the indicator 28 includes a charging indicator and a power supply indicator (both are not illustrated). The charging indicator is ON during the charging operation of the portable charger 2 (during the AC/DC conversion operation of the AC/DC converter 25), and is OFF during the other operations. The power supply indicator is ON during the power supply operation of the portable charger 2 (during the DC/AC conversion operation of the AC/DC converter 25), and is OFF during the other operations. In this manner, the user around the portable charger 2 can easily check the operation status of the portable charger 2.

The indicator 28 may include a small-size display (such as a liquid crystal panel) in place of the charging indicator. The operation panel 27 and the small-size display may be integrated into a touch panel.

In response to a command from the controller 20, the communication module 29 transmits the operation status of the portable charger 2 to a user's mobile terminal (such as a smartphone). Thus, the user can check the operation status of the portable charger 2 even at a place remote from the portable charger 2. For example, the user can be informed about an end timing of charging or power supply while doing something else.

The controller 20 includes a processor 201 such as a central processing unit (CPU), a memory 202 including a read only memory (ROM) and a random access memory (RAM), and an input/output port 203. The controller 20 may include a counter (timer) for measuring time. The controller 20 controls the components of the portable charger 2 based on a voltage detected by the voltage sensor 241 (or the voltage sensor 243), a current detected by the current sensor 242 (or the current sensor 244), a signal from the operation panel 27, a signal from the vehicle 1, and maps and programs stored in the memory 202. Specifically, the controller 20 controls the AC/DC conversion operation and the DC/AC conversion operation of the AC/DC converter 25, controls information to be indicated by the indicator 28 (ON/OFF of the charging indicator and the power supply indicator), and controls communication using the communication module 29. The controller 20 is an example of "control circuit" according to the present disclosure.

As described above, the portable charger 2 includes the AC charging port 21 and the AC power supply port 22 separately, and can execute both the charging operation and the power supply operation. In this structure, the charging and the power supply of the portable charger 2 can desirably be managed appropriately. More specifically, in the structure described above, the external power supply 3A may be connected to the AC charging port 21 and the external load 3B may be connected to the AC power supply port 22 though illustration is omitted. In this case, one of the external power supply 3A and the external load 3B may adversely affect the other. For example, in a case where the external power supply 3A outputs single-phase AC power of 200 V and the external load 3B consumes single-phase electric power of 100 V, the AC power from the external power supply 3A may be input to the external load 3B to cause malfunction of the external load 3B.

In this embodiment, the switching circuit 23 switches a connection destination of the power lines ACL selectively (exclusively) between the AC charging port 21 and the AC power supply port 22. In other words, either one of the AC charging port 21 and the AC power supply port 22 is connected to the power lines ACL, and both of the AC charging port 21 and the AC power supply port 22 are never simultaneously connected to the power lines ACL. Therefore, the AC charging port 21 and the AC power supply port 22 are electrically disconnected constantly. Thus, even if the external power supply 3A is connected to the AC charging port 21 and the external load 3B is connected to the AC power supply port 22, electric connection between the external power supply 3A and the external load 3B can be prevented. Accordingly, malfunction of the external load 3B can be prevented. That is, the portable charger 2 can be managed to prevent mutual or unilateral adverse effect between the external power supply 3A and the external load 3B.

Control Flow

Figure 6:
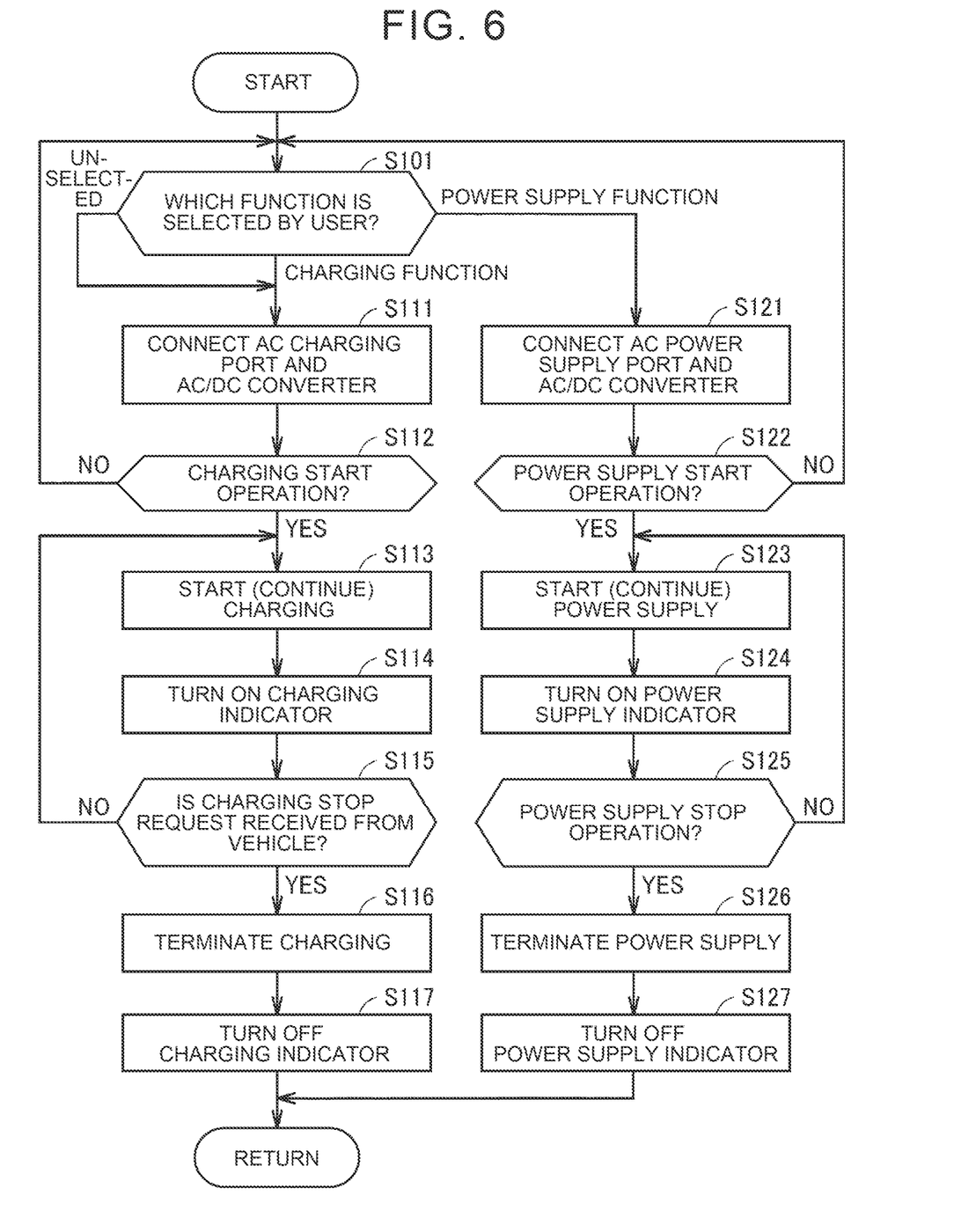
FIG. 6 is a flowchart illustrating the charging operation and the power supply operation of the portable charger according to the embodiment.

FIG. 6 is a flowchart illustrating control on the portable charger 2 according to this embodiment. The process in this flowchart is repeated in every predetermined calculation period. Steps in this flowchart are implemented through a software process by the controller 20, but may be implemented by hardware (electric circuit) provided in the controller 20. Each step is hereinafter abbreviated as "S".

Prior to the start of execution of the process in this flowchart, the portable charger 2 is connected between the vehicle 1 and the external device 3 (external power supply 3A or external load 3B). Although details are described later, an operation voltage of the controller 20 of this embodiment is supplied from the vehicle 1 or the external device 3. The source of the operation voltage of the controller 20 is not particularly limited. The controller 20 may have an internal battery (not illustrated).

Referring to FIG. 6, the controller 20 determines in S101 which of the charging function and the power supply function is selected by the user. When the user selects the charging function by operating the operation panel 27 ("Charging Function" in S101), the controller 20 advances the process to S111, and controls the switching circuit 23 to electrically connect the AC charging port 21 and the AC/DC converter 25 via the power lines ACL (see FIG. 3). The controller 20 controls the indicator 28 to indicate that the charging function is selected.

When the user selects the power supply function by operating the operation panel 27 ("Power Supply Function" in S101), the controller 20 advances the process to S121, and controls the switching circuit 23 to electrically connect the AC power supply port 22 and the AC/DC converter 25 via the power lines ACL (see FIG. 4). The controller 20 controls the indicator 28 to indicate that the power supply function is selected.

When the user does not operate the operation panel 27 ("Unselected" in S101), the controller 20 may control the switching circuit 23 to electrically connect the AC charging port 21 and the AC/DC converter 25 similarly to the case where the charging function is selected (S111). That is, in a default state before the user operates the operation panel 27, the portable charger 2 is tentatively set to the state in which the charging function is selected. In the portable charger 2, the user is generally likely (frequently) to select the charging function rather than the power supply function. By setting the charging function as the default function, the user can save some work for operating the operation panel 27.

When the charging function is selected in S101 (or when the user's operation is not performed and the default state continues), the controller 20 causes the switching circuit 23 to electrically connect the AC charging port 21 and the AC/DC converter 25 (S111), and then waits until the user performs a charging start operation on the operation panel 27 ("NO" in S112). Examples of the charging start operation include an operation of depressing a charging start switch (not illustrated) provided on the operation panel 27. When the charging start operation is performed ("YES" in S112), the controller 20 starts charging the vehicle 1 from the external power supply 3A in accordance with a predetermined charging sequence (S113). Various known sequences may be employed as the charging sequence. During the charging of the vehicle 1, the controller 20 controls the indicator 28 to turn ON the charging indicator (S114).

The controller 20 returns the process to S113 until a charging stop request is received from the vehicle 1 ("NO" in S115), and continues to charge the vehicle 1. The vehicle 1 transmits the charging stop request to the portable charger 2, for example, when the battery 15 is fully charged or when a predetermined time has come during timer charging. When the charging stop request is received from the vehicle 1 ("YES" in S115), the controller 20 controls the AC/DC converter 25 to terminate the charging of the vehicle 1

(S116). The controller 20 controls the indicator 28 to turn OFF the charging indicator, thereby notifying the user that the charging is terminated (S117). Then, the controller 20 returns the process to a main routine.

When the power supply function is selected in S101, the controller 20 causes the switching circuit 23 to electrically connect the AC power supply port 22 and the AC/DC converter 25 (S121), and then waits until the user performs a power supply start operation on the operation panel 27 ("NO" in S122). Examples of the power supply start operation include an operation of depressing a power supply start switch (not illustrated) provided on the operation panel 27. When the power supply start operation is performed ("YES" in S122), the controller 20 starts supplying electric power to the external load 3B from the vehicle 1 (S123). The power supply from the vehicle 1 is typically executed at constant power or constant voltage. During the power supply from the vehicle 1, the controller 20 controls the indicator 28 to turn ON the power supply indicator (S124). The controller 20 may provide a notification by using the communication module 29 in place of or in addition to the indicator 28.

The controller 20 returns the process to S123 until the operation panel 27 receives a user's power supply stop operation (such as an operation of depressing a power supply stop switch (not illustrated)) ("NO" in S125), and continues to supply electric power from the vehicle 1. Instead of the power supply stop operation, the power supply may be stopped when a predetermined time has come (timer power supply). When the operation panel 27 receives the power supply stop operation ("YES" in S125), the controller 20 controls the AC/DC converter 25 to terminate the power supply from the vehicle 1 (S126). The controller 20 controls the indicator 28 to turn OFF the power supply indicator, thereby notifying the user that the power supply is terminated (S127). The controller 20 may provide a notification by using the communication module 29 in place of or in addition to the indicator 28. After the process of S117 or S127, the controller 20 returns the process to the main routine.

As described above, the switching circuit 23 of this embodiment executes switching to choose whether to electrically connect the AC/DC converter 25 to the AC charging port 21 or to the AC power supply port 22. Therefore, the AC charging port 21 and the AC power supply port 22 are electrically disconnected constantly. Thus, even if the external power supply 3A is connected to the AC charging port 21 and the external load 3B is connected to the AC power supply port 22, the portable charger 2 does not mediate electric interaction between the external power supply 3A and the external load 3B. According to this embodiment, the charging and the power supply of the portable charger 2 can be managed appropriately.

In this embodiment, the controller 20 operates with the initial state (default state) set to the state in which the charging function is selected ("Unselected" in S101). Typical users select the charging function more frequently than the power supply function. Therefore, the charging function is regarded as being selected until either function is selected, thereby reducing the number of user's operations and improving usability of the operation panel 27.

Operation Voltage of Controller

Next, detailed description is given about how the operation voltage of the controller 20 is supplied to the controller 20 from the outside of the controller 20.

Figure 7:
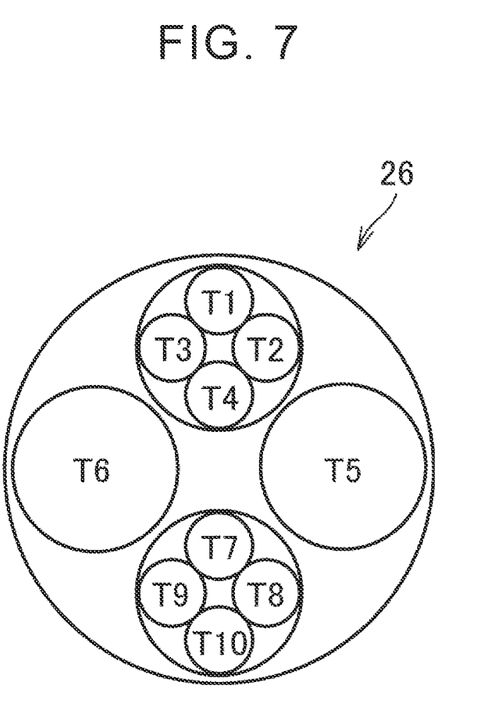
FIG. 7 is a diagram illustrating an example of a connection face of a DC connector.

FIG. 7 is a diagram illustrating an example of a connection face of the DC connector 26. Referring to FIG. 7, the DC connector 26 in this example conforms to a CHAdeMO power transfer standard. The DC connector 26 includes terminals T1 to T10.

The terminal T1 is a ground terminal. The terminals T2, T4, and T7 to T10 are signal terminals, including various terminals for starting or stopping operation, checking connection of the connector, or transferring a CAN signal. The terminals T5 and T6 are power terminals (positive/negative terminals) where DC power is input and output.

The terminal T3 transfers an auxiliary device voltage Vaux (for example, Vaux=12 V) of an auxiliary device battery 101 (see FIG. 8) mounted on the vehicle 1. The portable charger 2 operates by using the auxiliary device voltage Vaux supplied from the vehicle 1 via the terminal T3.

The type of the power transfer standard for the DC connector 26 is not particularly limited. The DC connector 26 may conform to a standard other than CHAdeMO (Combined Charging System (CCS), GB/T, or Tesla). The terminal of the DC connector 26 to be used for supplying the operation voltage to the controller 20 may be set as appropriate depending on the power transfer standard for the DC connector 26.

Figure 8:
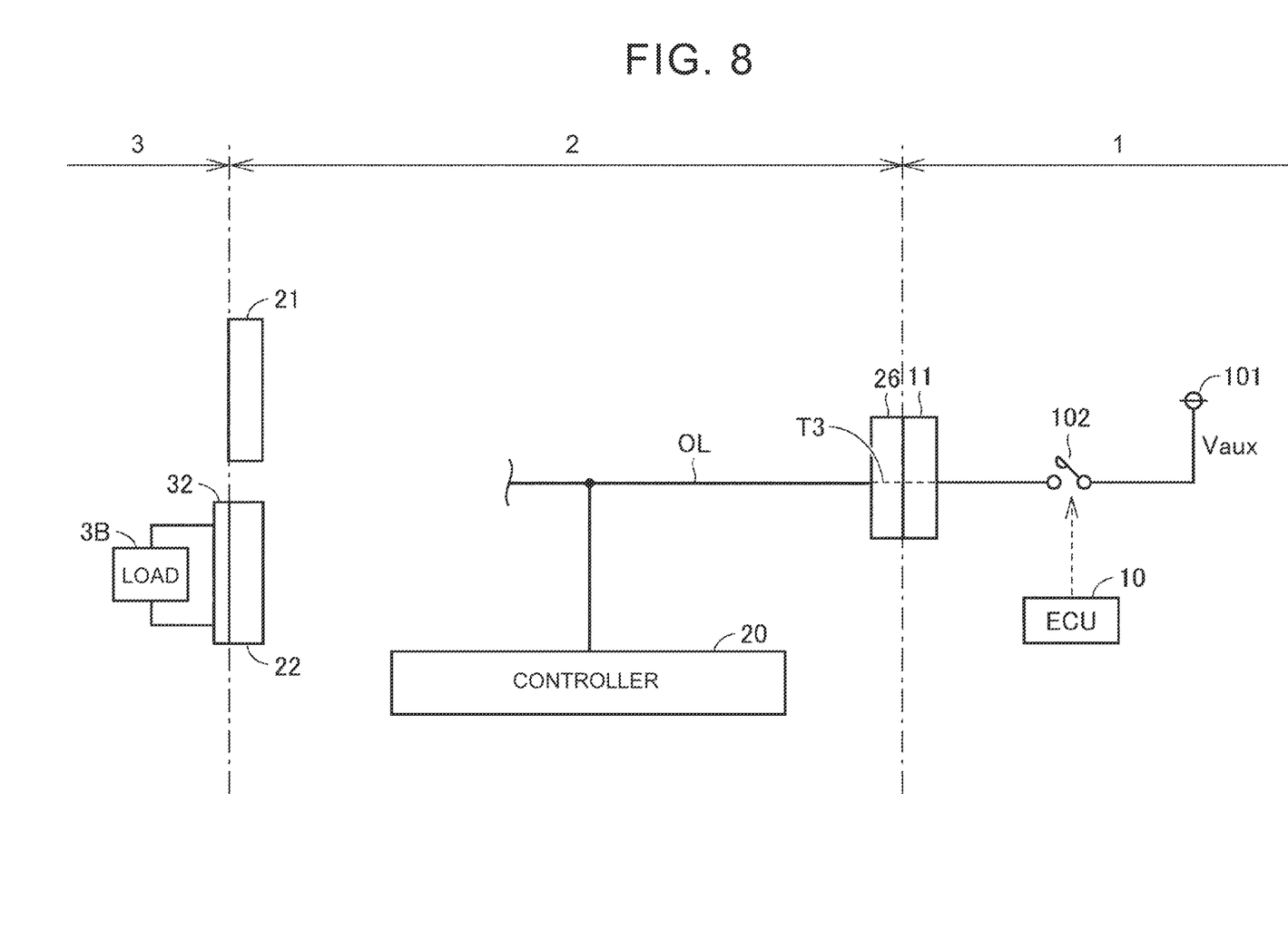
FIG. 8 is a circuit block diagram illustrating a circuit structure for supplying the portable charger with an operation voltage for the power supply operation.

FIG. 8 is a circuit block diagram illustrating a circuit structure for supplying the portable charger 2 with an operation voltage for the power supply operation. Referring to FIG. 8, the vehicle 1 further includes the auxiliary device battery 101 and an auxiliary device relay 102. The auxiliary device relay 102 is electrically connected between the auxiliary device battery 101 and the inlet 11, and is opened or closed in response to a command from the ECU 10.

When the DC connector 26 of the portable charger 2 is connected to the inlet 11 of the vehicle 1, the auxiliary device relay 102 is closed. Then, the auxiliary device battery 101 and an operation voltage line OL of the controller 20 are electrically connected via the terminal T3 of the DC connector 26. Thus, the auxiliary device voltage Vaux of the auxiliary device battery 101 can be supplied to the controller 20 as the operation voltage.

The vehicle 1 or the portable charger 2 may further include a buck converter configured to step down the auxiliary device voltage Vaux of the auxiliary device battery 101. By using the buck converter, the operation voltage of the controller 20 can be generated from the auxiliary device voltage Vaux.

Figure 9:
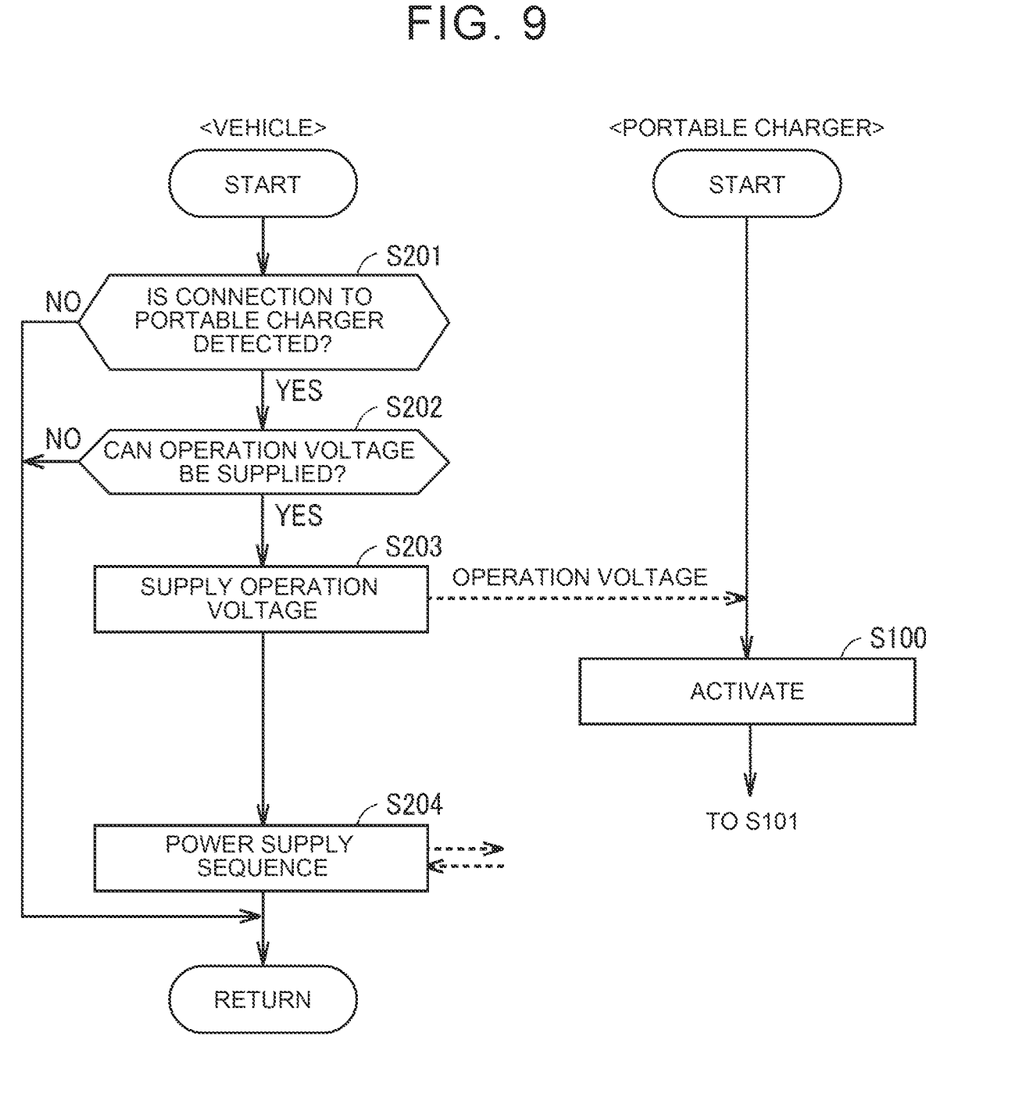
FIG. 9 is a flowchart illustrating control on a vehicle and the portable charger prior to the power supply operation.

FIG. 9 is a flowchart illustrating control on the vehicle 1 and the portable charger 2 prior to the power supply operation. In FIG. 9, a process to be executed by the ECU 10 of the vehicle 1 is illustrated on the left, and a process to be executed by the controller 20 of the portable charger 2 is illustrated on the right. The processes in the flowchart of FIG. 9 are executed prior to the process in the flowchart of FIG. 6. In the vehicle 1, an ignition-ON (IG-ON) operation is executed, and the ECU 10 is activated.

Referring to FIG. 9, the ECU 10 determines in S201 whether the inlet 11 of the vehicle 1 is connected to the DC connector 26 of the portable charger 2. This determination can be made based on a voltage value of the signal terminal for checking connection of the connector (for example, the terminal T7).

When the connection of the DC connector 26 of the portable charger 2 is detected ("YES" in S201), the ECU 10 determines whether a condition to supply the operation voltage from the terminal T3 is satisfied (S202). For example, the ECU 10 can determine that the condition is satisfied when the auxiliary device voltage Vaux of the auxiliary device battery 101 falls within a specified voltage range. When the ECU 10 confirms that the condition to supply the operation voltage is satisfied ("YES" in S202), the ECU 10 starts supplying the operation voltage to the portable charger 2 by closing the auxiliary device relay 102 (S203). The controller 20 of the portable charger 2 is activated by receiving the supplied operation voltage (S100).

A process subsequent to S100 is similar to the process of S101 and subsequent steps of FIG. 6, and detailed description is therefore omitted. Although illustration is omitted, the ECU 10 that has executed a power supply sequence (S204) may terminate the supply of the operation voltage from the vehicle 1 to the portable charger 2 by opening the auxiliary device relay 102.

As described above, in this embodiment, the operation voltage of the controller 20 is supplied to the portable charger 2 from the outside of the portable charger 2. Thus, the internal battery of the portable charger 2 for operating the controller 20 can be omitted. As a result, electric power in the internal battery is not exhausted, thereby eliminating the need for measures against the power exhaustion.

In this example, the operation voltage of the controller 20 during the power supply operation of the portable charger 2 is supplied from the vehicle 1. The vehicle 1 serving as a power source has sufficient electric power in the battery 15, and can exchange electric power between the battery 15 and the auxiliary device battery 101. Thus, the operation voltage of the controller 20 can be supplied with a good allowance.

Modified Examples

Figure 10:
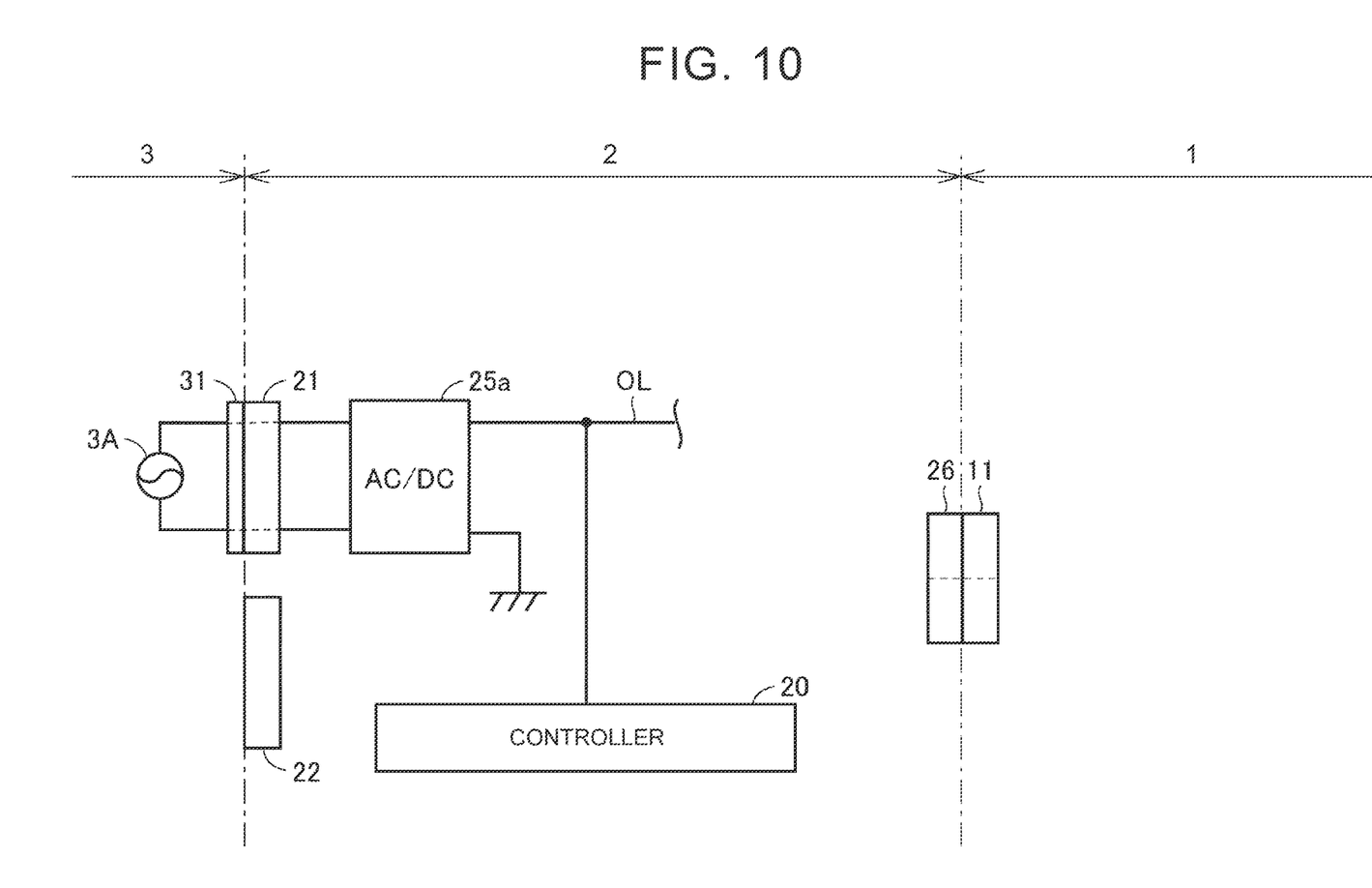
FIG. 10 is a circuit block diagram illustrating a circuit structure for supplying the portable charger with an operation voltage for the charging operation.

FIG. 10 is a circuit block diagram illustrating a circuit structure for supplying the portable charger 2 with an operation voltage for the charging operation. Referring to FIG. 10, the portable charger 2 may include a small-size AC/DC converter 25a configured to generate the operation voltage of the controller 20. The AC/DC converter 25a converts an AC voltage supplied from the external power supply 3A into the operation voltage of the controller 20. Control on the portable charger 2 in this circuit structure is similar to the control in the flowchart of FIG. 6, and description is therefore omitted.

Since the operation voltage of the controller 20 during the charging operation of the portable charger 2 is supplied from the external power supply 3A, the operation voltage of the controller 20 can be supplied with a good allowance. The operation voltage of the controller 20 during the charging operation of the portable charger 2 may be supplied from the vehicle 1.

The portable charger 2 may receive the operation voltage supplied both from the external power supply 3A and from the vehicle 1. In other words, the circuit structure illustrated in FIG. 8 and the circuit structure illustrated in FIG. 10 may be combined.

The portable charger 2 may include a connector adapted both to DC power (DC) and to AC power (AC) in place of the DC connector 26. That is, the portable charger 2 may execute AC/AC conversion in addition to the AC/DC conversion. The shapes of the AC charging port 21, the AC power supply port 22, and the DC connector 26 of the portable charger 2 may be replaceable in conformity with desired power transfer standards (CHAdeMO, CCS, GB/T, and Tesla).

It should be understood that the embodiment disclosed herein is illustrative but is not limitative in all respects. The scope of the present disclosure is defined by the claims rather than the description of the embodiment above, and is intended to encompass meanings of equivalents to the elements in the claims and all modifications within the scope of the claims.

What is claimed is:

1. A power conversion device configured to execute power conversion between a vehicle and an external power supply or an external load, the power conversion device comprising:
  a DC connector configured to be directly coupled to an inlet of the vehicle and configured to transfer direct current power between the DC connector and the inlet of the vehicle;
  a charging port configured to receive alternating current power from the external power supply;
  a power supply port configured to output alternating current power to the external load;
  a power conversion circuit that is a bidirectional power conversion circuit and configured to execute power conversion between the DC connector and the charging port and between the DC connector and the power supply port, each of the power conversion circuit, the charging port, and the power supply port includes a first terminal and a second terminal;
  a switching circuit configured to execute switching to choose whether to electrically connect the power conversion circuit and the charging port or electrically connect the power conversion circuit and the power supply port, the switching circuit includes a first relay and a second relay, the first relay being configured to execute switching to choose whether to connect the first terminal of the power conversion circuit to the first terminal of the charging port or to the first terminal of the power supply port, the second relay being configured to execute switching to choose whether to connect the second terminal of the power conversion circuit to the second terminal of the charging port or to the second terminal of the power supply port; and
  a control circuit configured to control the power conversion circuit and the switching circuit to selectively execute a charging operation or a power supply operation, the charging operation being an operation of converting alternating current power supplied from the external power supply via the charging port into direct current power by the power conversion circuit, outputting the direct current power from the DC connector, and charging the vehicle with the direct current power, the power supply operation being an operation of converting direct current power supplied from the vehicle via the DC connector into alternating current power by the power conversion circuit, outputting the alternating current power from the power supply port, and supplying the alternating current power to the external load.

2. The power conversion device according to claim 1, wherein the control circuit is configured to use a voltage supplied from the vehicle via the DC connector as an operation voltage of the control circuit during execution of the power supply operation.

3. The power conversion device according to claim 1, wherein the control circuit is configured to use a voltage supplied from the external power supply via the charging port as an operation voltage of the control circuit during execution of the charging operation.

4. The power conversion device according to claim 1, further comprising an operator configured to receive a user's operation for selecting the charging operation or the power supply operation, wherein the control circuit is configured to control the switching circuit to electrically connect the charging port and the power conversion circuit until the operator receives the user's operation.

5. A power transfer system comprising:
a vehicle; and
a power conversion device configured to execute power conversion between the vehicle and an external power supply or an external load, the power conversion device including:
a DC connector configured to be directly coupled to an inlet of the vehicle and configured to transfer direct current power between the DC connector and the inlet of the vehicle;
a charging port configured to receive alternating current power from the external power supply;
a power supply port configured to output alternating current power to the external load;
a power conversion circuit that is a bidirectional power conversion circuit and configured to execute power conversion between the DC connector and the charging port and between the DC connector and the power supply port, each of the power conversion circuit, the charging port, and the power supply port includes a first terminal and a second terminal;
a switching circuit configured to execute switching to choose whether to electrically connect the power conversion circuit and the port or electrically connect the power conversion circuit and the power supply port, the switching circuit includes a first relay and a second relay, the first relay being configured to execute switching to choose whether to connect the first terminal of the power conversion circuit to the first terminal of the charging port or to the first terminal of the power supply port, the second relay being configured to execute switching to choose whether to connect the second terminal of the power conversion circuit to the second terminal of the charging port or to the second terminal of the power supply port; and
a control circuit configured to control the power conversion circuit and the switching circuit to selectively execute a charging operation or a power supply operation, the charging operation being an operation of converting alternating current power supplied from the external power supply via the charging port into direct current power by the power conversion circuit, outputting the direct current power from the DC connector, and charging the vehicle with the direct current power, the power supply operation being an operation of converting direct current power supplied from the vehicle via the DC connector into alternating current power by the power conversion circuit, outputting the alternating current power from the power supply port, and supplying the alternating current power to the external load, wherein:
the control circuit is configured to use a voltage supplied from the vehicle via the DC connector as an operation voltage of the control circuit during execution of the power supply operation; and
the vehicle includes a relay configured to output the operation voltage of the control circuit for execution of the power supply operation after detection of connection between the inlet and the DC connector.

6. A power conversion device configured to execute power conversion between a vehicle and an external power supply or an external load, the power conversion device comprising:
a DC connector configured to be directly coupled to an inlet of the vehicle and configured to transfer direct current power between the DC connector and the inlet of the vehicle;
a charging port configured to receive alternating current power from the external power supply;
a power supply port configured to output alternating current power to the external load;
a power conversion circuit that is a bidirectional power conversion circuit and configured to execute power conversion between the DC connector and the charging port and between the DC connector and the power supply port;
a switching circuit configured to execute switching to choose whether to electrically connect the power conversion circuit and the charging port or electrically connect the power conversion circuit and the power supply port; and
a control circuit configured to control the power conversion circuit and the switching circuit to selectively execute a charging operation or a power supply operation, the charging operation being an operation of converting alternating current power supplied from the external power supply via the charging port into direct current power by the power conversion circuit, outputting the direct current power from the DC connector, and charging the vehicle with the direct current power, the power supply operation being an operation of converting direct current power supplied from the vehicle via the DC connector into alternating current power by the power conversion circuit, outputting the alternating current power from the power supply port, and supplying the alternating current power to the external load,
wherein the power conversion device is movable with respect to a vehicle.

7. The power conversion device according to claim 6, wherein the control circuit is configured to use a voltage supplied from the vehicle via the DC connector as an operation voltage of the control circuit during execution of the power supply operation.

8. The power conversion device according to claim 6, wherein the control circuit is configured to use a voltage supplied from the external power supply via the charging port as an operation voltage of the control circuit during execution of the charging operation.

9. The power conversion device according to claim 6, further comprising an operator configured to receive a user's operation for selecting the charging operation or the power supply operation, wherein the control circuit is configured to control the switching circuit to electrically connect the charging port and the power conversion circuit until the operator receives the user's operation.

* * * * *